Figure 8:
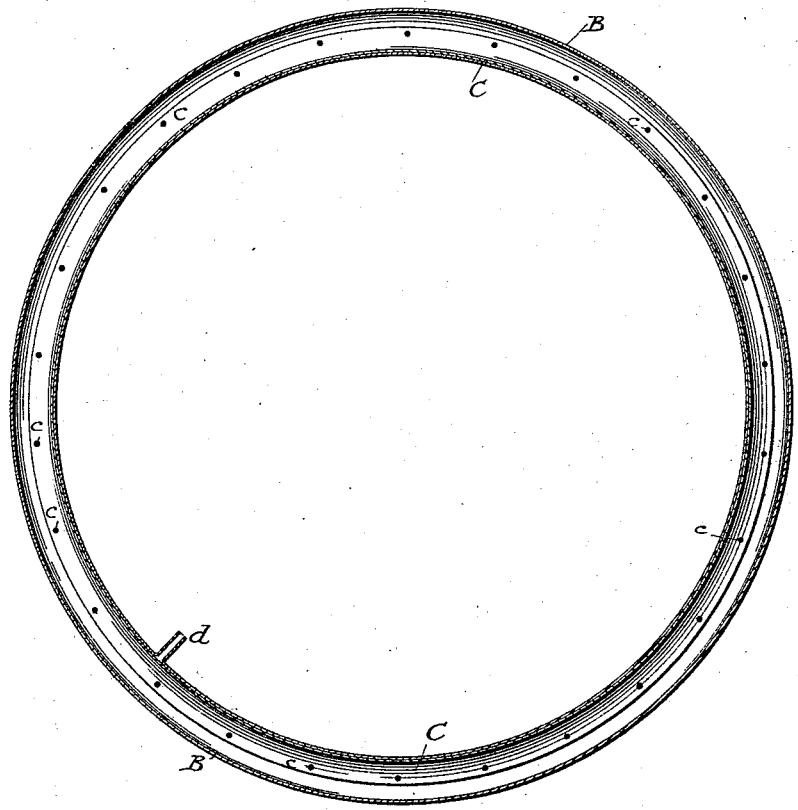

(No Model.) 2 Sheets—Sheet 1.
E. W. YOUNG.
PNEUMATIC TIRE.
No. 527,097. Patented Oct. 9, 1894.
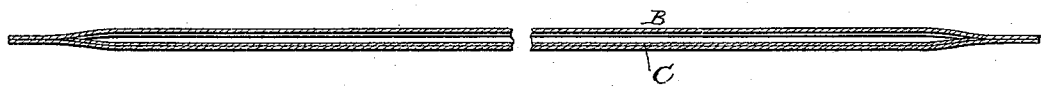
Fig. 1.
Fig. 2.
Fig. 3. Fig. 4.
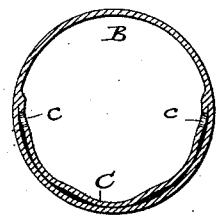 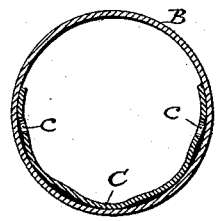
Fig. 5.
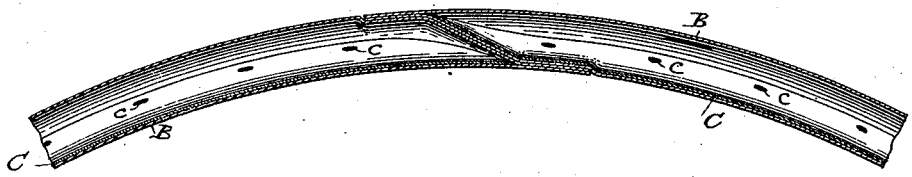
Fig. 6.
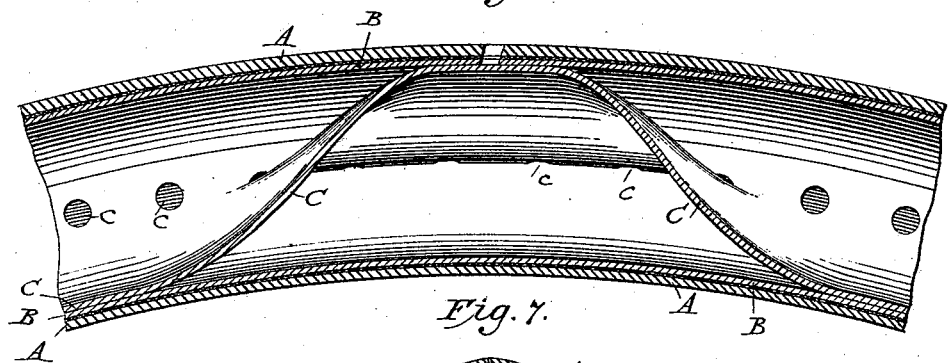
Fig. 7.
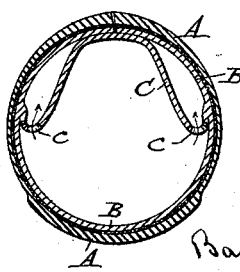
Witnesses,
Inventor,
ERNEST W. YOUNG,
by his attorneys, (No Model.) 2 Sheets—Sheet 2.

E. W. YOUNG.
PNEUMATIC TIRE.

No. 527,097. Patented Oct. 9, 1894.

Witnesses;

Inventor,
ERNEST W. YOUNG,
by his attorneys,

UNITED STATES PATENT OFFICE.

ERNEST W. YOUNG, OF MICHIGAN CITY, INDIANA.

PNEUMATIC TIRE.

SPECIFICATION forming part of Letters Patent No. 527,097, dated October 9, 1894.

Application filed May 8, 1894. Serial No. 510,441. (No model.)

*To all whom it may concern:*

Be it known that I, ERNEST W. YOUNG, a citizen of the United States, residing at Michigan City, in the county of La Porte and State of Indiana, have invented certain new and useful Improvements in Pneumatic Tires, of which the following is a specification.

My invention more especially relates to tires of the kind known as hollow or pneumatic tires, now extensively used on bicycles and other vehicles, and its principal object is to enable one easily, quickly, effectually and permanently to repair punctures in such tires. These ends I attain by the employment of apertured, longitudinally arranged webs, layers or diaphragms secured to the tire at or near their edges and constituting patching plies, the portion of which opposite a puncture may be secured to the tire by cement inserted through the puncture.

In order to carry out my invention in the best way now known to me, I insert within the casing or sheath of a tire constructed in any of the usual well known ways, an air tube, the tread side of which may consist of a single web, layer or ply of the required thickness, while the opposite side may be composed of two or more separate webs, layers or plies, the outer one of which may constitute a continuation or part of the air-tube, while the inner layer or layers—which I call the patching plies—may either be secured to or made integral with this air-tube, preferably along a longitudinal, central line, on opposite sides of this tube, and apertured or perforated at suitable points so that air may pass from one side of the plies to the other to balance the pressure on opposite sides thereof, when, to facilitate closing a puncture, the patching ply is brought to the tread side, as hereinafter explained. In their normal condition, that is, with the tire inflated, these patching plies are forced by the air-pressure inward against the rim side of the air-tube, the pressure being sufficient to hold them against the centrifugal force of the rotating wheel. Under this organization, the tread of the casing or sheath, as well as the air-tube, may be punctured without the puncturing instrument reaching the patching-plies, and even should it so reach the latter their flexure, around a point where cemented to the tread, would prevent injury thereto.

A puncture in the casing or sheath can readily be repaired by inserting the nozzle of a cement-tube through the puncture into the air-tube, and liquid cement of the kind usually employed for analogous purposes is then injected through the nozzle into the tube, while the wheel is turned so that the puncture will be at the lowest point. When enough cement is injected, the nozzle is removed. This method of manipulation effectually prevents cement from getting between the air-tube and casing, even should they not be united or cemented together. The tire being deflated, pressure is made upon the sheath at the point of puncture, so as to spread the cement over the contiguous surfaces of the air-tube and patching-ply around the puncture. When the cement is dried sufficiently to stick, the casing or sheath is partially inflated, and firmly pressed upon the rim, thus causing the patching-ply to adhere to the air-tube around and over the puncture, effectually closing the latter. When the tire is again inflated, the loose portions of the patching-ply will be drawn inward toward the rim or opposite side of the tread again, out of the way of further puncturing instruments.

Should the repair of a second puncture at the same point be desirable, or of a new one upon the opposite side of the sheath, it may be done by utilizing the second patching-ply already mentioned in the way hereinbefore described.

My improvements are applicable to the various constructions of tires now in use, but this latter construction is peculiarly adaptable to those of the so-called "hose pipe" class, in which the air-tube is cemented or vulcanized throughout its surface to the outer casing, which is not slit upon the side next the rim, but is continuous like hydraulic hose.

The accompanying drawings show so much only of the preferred form of my improved hollow or pneumatic tire as is necessary to illustrate the subject-matter claimed, it being understood that unless otherwise indicated, the parts are of usual approved construction.

Figure 9:
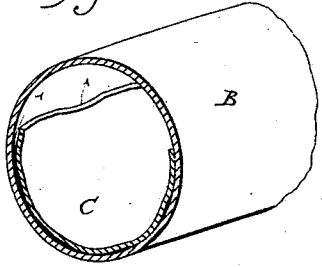
Figure 11:
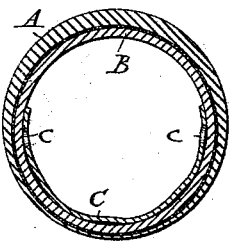
Figure 10:
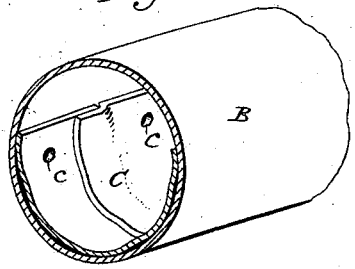
Figure 12:
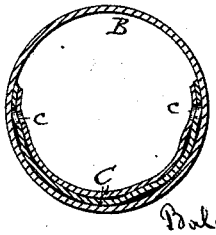

Figure 1 represents a vertical, longitudinal section through one form of air-tube and patching-ply; Fig. 2, a cross-section therethrough; Fig. 3, a similar section showing the air-tube inflated, and the patching-ply integral therewith; Fig. 4, a similar view of the same, showing the patching-ply cemented or vulcanized to the tube; Fig. 5, a vertical longitudinal section through the tube, showing its closed ends overlapping the inflatable portions of the tube; Fig. 6, a similar view, on an enlarged scale, showing the patching-ply cemented over a puncture to close it; Fig. 7, a cross-section of the tube showing the position of the patching-ply, when cemented over a puncture; Fig. 8, a longitudinal section through an inflated continuous air-tube and its patching-ply; Fig. 9, a perspective, sectional view of an air-tube having the patching-ply secured thereto at intervals, instead of being perforated; Fig. 10, a similar view of a tube having patching-plies with overlapping ends; Fig. 11, a cross-section through a casing or sheath and tube with a single patching-ply, and Fig. 12, a similar section through a tube provided with two overlying patching-plies.

The exterior portion, casing or sheath of a hollow or pneumatic tire ordinarily consists, as is well-known, of successive overlying layers of rubber or gutta-percha and of canvas cloth or other restraining material cemented or vulcanized together in the form of an endless tube, the layers of cloth serving to prevent the undue expansion of the casing or sheath, while the rubber renders it elastic.

The drawings show a separate air-tube B, fitting snugly in a casing or sheath A. It may either be held in contact therewith by the internal air-pressure, or the two may be cemented or vulcanized together, either through a part or all of its adjoining surfaces. Another tube or strip, or series of overlapping tubes or strips herein termed a "patching-ply" or plies, fits loosely inside the air-tube to which it is cemented or united at suitable points.

Figs. 1 to 7, both inclusive, show my improvements adapted to a tire of the well-known Morgan & Wright construction, in which the air-tube is made in the form of a normally flat tube with solid flattened ends, which tube, in its uninflated state, is drawn or threaded into the casing or sheath through a lateral opening temporarily made therein. The ends of the air-tube are then caused to abut and overlap each other, the tube is inflated, and the opening in the casing closed in well-known ways.

Figs. 3 to 7, both inclusive, show the air-tube as inflated. The patching-ply C, is shown in these figures in the form of a longitudinal diaphragm, trough or half tube, normally lying slackly upon that side of the air-tube B, opposite its tread, the edges of the patching-ply being connected with the opposite sides of the air-tube.

Figs. 3 and 4 show the patching-ply as wider than the semi-diameter of the air-tube between its junction-points therewith, so as normally to assume a slightly undulating or wrinkled attitude therein. When the sheath or air-tube is inflated, however, the central or loose portion of this patching-ply is forced inward against the rim side of the tire, and normally remains there, as shown in Figs. 3, 4 and 5.

Air-holes or perforations c, in the patching-ply, admit air to either side thereof, at points at which the patching-ply is cemented to the tread side of the sheath or tube, to repair punctures, but the air-pressure on the ply forces it inward, as shown in Fig. 6, at all other parts of the sheath, and holds it there even against the centrifugal force generated by the wheel when in rapid rotation. These air-holes may be in any desired part of the patching-ply, but preferably are arranged longitudinally on opposite sides of the tube, near the junction lines of the patching-ply therewith. Figs. 6 and 7 show these air-holes in the patching-ply itself. Fig. 11 shows them as formed by leaving portions of the edges of the patching-ply unconnected with the walls of the sheath or tube.

The casing and tube are provided with the usual air-inlet and valves, as indicated at $d$, Fig. 8.

The operation of my improved tire will be readily understood from the foregoing description.

I am aware that it has been proposed to use a lining, patch, strip or tube, actuated by compressed air to close a puncture in a pneumatic tire, and do not broadly claim every form of such a device, but, so far as I am aware, I am the first to employ a slack diaphragm, secured at or near its edges longitudinally in a casing, sheath or air-tube, as a patching-ply to close a puncture in the tread side of a tire. It will be observed that the central portion of my improved patching-ply normally lies against or alongside the base or rim side of the sheath, where punctures do not ordinarily occur; so that, when that portion of the patching-ply opposite the puncture is drawn to the tread side, to close the puncture, the remaining or unattached portion of the patching-ply remaining on the rim side, is out of the way of puncturing instruments.

What I claim herein is—

1. A hollow or pneumatic tire containing a perforated patching-ply secured thereto at its edges, substantially as set forth.

2. A hollow or pneumatic tire containing a patching-ply secured thereto at its edges, and apertured near said edges, substantially as set forth.

3. A hollow or pneumatic tire containing a longitudinally arranged patching-ply secured thereto at its edges, apertured near said edges and having its free intervening portions normally adjacent to the base or rim side of the tire, substantially as set forth.

4. A hollow or pneumatic tire containing a longitudinally arranged patching-ply apertured near said edges secured to opposite sides of the inflatable tubular portion of the tire, and having its free intervening portions normally adjacent to the base or rim side of the tire, substantially as set forth.

5. A pneumatic-tire air-tube provided with a longitudinal, apertured or perforated patching-ply secured thereto at its edges, substantially as set forth.

6. A pneumatic air-tube provided with a single wall or layer on its tread side, and a double layer on its opposite side, one layer constituting an apertured or perforated patching-ply adapted to be cemented to the tread-side layer through a puncture therein, substantially as set forth.

7. A pneumatic-tire air-tube having a patching-ply secured longitudinally therein, on opposite sides thereof, with perforations near its junction-lines, substantially as set forth.

8. A pneumatic-tire air-tube having separate overlying perforated slack diaphragms constituting patching-plies, secured longitudinally therein, on opposite sides thereof, substantially as set forth.

9. The hereinbefore described hollow or pneumatic wheel tire consisting of the combination of a casing or sheath, an air-tube therein, an apertured or perforated patching-ply secured longitudinally therein, on opposite sides thereof, and an air-valve, the combination being and operating as set forth.

10. The combination, substantially as hereinbefore set forth, of a casing or sheath, an air-tube, a series of separate superposed apertured or perforated diaphragms or patching-plies therein, and an air-valve passing through the casing and air-tube, for the purposes specified.

In testimony whereof I have hereunto subscribed my name.

ERNEST W. YOUNG.

Witnesses:
W. B. MAURY,
T. T. SPIRO.